United States Patent
Kawai et al.

[11] Patent Number: 6,108,120
[45] Date of Patent: Aug. 22, 2000

[54] FARADAY ROTATION ANGLE VARYING APPARATUS

[75] Inventors: Hirotaka Kawai, Shizuoka; Hiromitsu Umezawa, Aichi; Youichi Suzuki, Shizuoka; Hidenori Nakada, Aichi, all of Japan

[73] Assignee: FDK Corporation, Japan

[21] Appl. No.: 09/139,817

[22] Filed: Aug. 25, 1998

[51] Int. Cl.$^7$ ........................................ G02F 1/09
[52] U.S. Cl. ................... 359/283; 359/281; 359/484; 324/96; 324/244.1
[58] Field of Search .................. 359/280, 281, 359/283, 256, 484; 324/96, 244, 244.1

[56] References Cited

U.S. PATENT DOCUMENTS

| | | |
|---|---|---|
| 3,495,189 | 2/1970 | Le Craw . |
| 4,896,103 | 1/1990 | Shimanuki et al. . |
| 5,493,222 | 2/1996 | Shirai et al. ........................ 324/244.1 |
| 5,535,046 | 7/1996 | Shirai et al. ........................ 359/281 |
| 5,566,017 | 10/1996 | Suzuki et al. ..................... 359/281 |
| 5,657,151 | 8/1997 | Swan et al. ....................... 359/281 |
| 5,739,943 | 4/1998 | Ohshima et al. .................. 359/281 |
| 5,867,300 | 2/1999 | Onaka et al. ..................... 359/283 |

*Primary Examiner*—Loha Ben
*Attorney, Agent, or Firm*—Dougherty & Associates

[57] ABSTRACT

A Faraday rotation angle varying apparatus for controlling a Faraday rotation angle of a light beam passing through a garnet single crystal having a Faraday effect by applying external magnetic fields to the garnet single crystal in two or more of directions and varying a synthetic magnetic field synthesized from the external magnetic fields is disclosed. According to an aspect of the present invention, the garnet single crystal has the (111) plane polished and the light beam is allowed to pass through the garnet single crystal along the <111> direction of the garnet single crystal perpendicular to the (111) plane. A displacement path of a synthetic vector of the external magnetic fields is within a fan-shaped range (peripheral lines of the fan-shape inclusive) of a stereographic projection chart of the garnet single crystal with the (111) plane taken as the center of the chart. The fan-shaped range is surrounded by two lines connecting a point indicating the (111) plane positioned at the center of the stereographic projection chart to two positions apart 10° rightward and leftward from a point indicating one of crystal planes equivalent to the (110) plane positioned on the outermost peripheral circle of the stereographic projection chart.

14 Claims, 14 Drawing Sheets

PATH a

PATH b

PATH c

PATH d

PATH e

PATH f

PATH g

PATH h

PATH i

PATH j

PATH k

PATH l

FARADAY ROTATION ANGLE VARYING APPARATUS

BACKGROUND OF THE INVENTION

1. Technical Field of the Invention

The present invention relates to an apparatus for controlling a Faraday rotation angle of a light beam passing through a garnet single crystal having a Faraday effect by applying external magnetic fields to a Faraday element composed of the garnet single crystal in two or more of directions and varying a synthetic magnetic field synthesized from the external magnetic fields. In particular, the present invention relates to a Faraday rotation angle varying apparatus capable of suppressing a variation in characteristics and also extending a variable range (typically, more than 90°) of a Faraday rotation angle by specifying a displacement path of a synthetic vector of external magnetic fields with respect to a crystal orientation. The apparatus is useful for a polarization scrambler, an optical attenuator, and the like.

2. Related Art

An optical communication system or the like requires a polarization scrambler for varying a polarization direction of light continuously and periodically or an optical attenuator for controlling a quantity of transmitted light, in which a Faraday rotation angle varying apparatus is incorporated. The Faraday rotation angle varying apparatus is used to control a Faraday rotation angle of a light beam passing through a Faraday element by applying magnetic fields to the Faraday element in two or more of directions and varying a synthetic magnetic field synthesized from these magnetic fields. In general, a magnetic garnet single crystal having a Faraday effect is used as a Faraday element.

The basic configuration of a polarization scrambler is shown in FIG. 3. Light outgoing from an optical fiber 10 is collimated through a lens 12, to form parallel beams of light. The parallel rays of light pass through a Faraday element 13 and are converged at an incident end of an optical fiber 17 through a lens 15. The Faraday element 13 is applied with a magnetic field in the direction parallel to the optical axis by an electromagnet 19, and is further applied with a magnetic field in the direction perpendicular to the optical axis by a pair of permanent magnets 22a and 22b. The polarization direction of a light beam passing though the Faraday element 13 can be changed continuously and periodically by applying a fixed magnetic field larger than a saturation magnetic field of the Faraday element 13 to the Faraday element 13 from the permanent magnets 22a and 22b so as to turn the Faraday element 13 into a magnetic saturation state and then changing the polarity of a current supplied to a coil of the electromagnet 19 so as to change the polarity of a synthetic magnetic field synthesized from the applied magnetic fields.

The basic configuration of an optical attenuator is shown in FIG. 4, and one example of the structure thereof is shown in FIG. 5. Light outgoing from an optical fiber 10 is collimated through a lens 12, to form parallel beams of light. The parallel beams of light pass through a polarizer 14, a Faraday element 16, and an analyzer 18, and are converged at an incident end of an optical fiber 22. The Faraday element 16 is applied with a magnetic field in the direction perpendicular to the optical axis by an electromagnet 30 and is further applied with a magnetic field in the direction parallel to the optical axis by a pair of permanent magnets 26 and 28. Each of the electromagnet 30 and permanent magnets 26 and 28 has an aperture allowing light beams to pass therethrough. The quantity of transmitted beams of light can be controlled by turning the Faraday element 16 into a magnetic saturation state by the permanent magnets 26 and 28, and changing a current supplied to a coil of the electromagnet 30 so as to change a synthetic magnetic field. In the figure, a portion indicated by reference numeral 24 is a Faraday rotation angle varying apparatus.

An optical attenuator mainly includes a polarizer, a Faraday rotation angle varying apparatus, and an analyzer which are arranged in this order. The Faraday rotation angle varying apparatus includes a Faraday element which is generally added with an electromagnet for applying a magnetic field in the direction perpendicular to the optical axis to the Faraday element and permanent magnets for applying a magnetic field in the direction parallel to the optical axis to the Faraday element. The Faraday element is turned into a magnetic saturation state by the permanent magnets, and the direction of a synthetic magnetic field is changed by varying a current supplied to a coil of the electromagnet. The Faraday rotation angle is changed by such turning of the synthetic magnetic field, to change a quantity of the beams of light passing through the analyzer.

In each of the polarization scrambler and optical attenuator, the Faraday rotation angle is required to be changed depending on magnetic fields applied to a Faraday element (garnet single crystal) with a high repeatability. To meet such a requirement, as described above, the Faraday rotation angle is changed by applying a fixed magnetic field larger than a saturation magnetic field of the Faraday element to the Faraday element in the direction perpendicular or parallel to light beams so as to turn the Faraday element into a magnetic saturation state, and then applying, in such a state, a variable magnetic field to the Faraday element in the direction parallel or perpendicular to the light beams so as to change a synthetic magnetic field, to thereby change the direction of magnetization of the Faraday element. The reason why the Faraday element is turned into a magnetic saturation state is that if the Faraday element is in a magnetic unsaturation state, there occur deterioration of the extinction ratio and scattering of light by generation of magnetic domains, thereby degrading repeatability of the Faraday rotation angle depending on the applied magnetic fields.

The present inventors have prepared, on the basis of the above knowledge, polarization scramblers and optical attenuators in each of which a Faraday element composed of a garnet single crystal was set to be turned into a magnetic saturation state by a fixed magnetic field applied from permanent magnets. Each polarization scrambler thus prepared, however, presented a problem that a DOP (Degree of Polarization) is largely varied up to 20 to 30%. Each optical attenuator thus prepared also presented a problem that a magnetic field applied from an electromagnet, which is required for obtaining the maximum attenuation, is largely varied in a range of about 400 to 1000 Oe.

Further, there occurs the following problem. In the case where the direction of a synthetic magnetic field is changed from the direction parallel to the optical axis to the direction perpendicular to the optical axis so as to change the Faraday rotation angle from 90° to 0°, the quantity of transmitted beams of light is changed from the maximum value to the minimum value when the angle formed between a polarizer and an analyzer becomes 90°. However, since the fixed magnetic field is usually applied in the direction along the optical axis by the permanent magnets, a very large magnetic field must be applied in the vertical direction to change the direction of magnetization of the Faraday element into the vertical direction. In this case, whatever large magnetic field is applied in the vertical direction, it is theoretically impossible to change the synthetic vector of the magnetic fields to be directed 90° (perpendicular) to the optical axis. Therefore, it has been regarded that the direction of magnetization of the Faraday element is not turned up to 90°, and consequently the Faraday rotation angle does not become 0°.

SUMMARY OF THE INVENTION

In view of the foregoing, the present invention has been made, and an object of the present invention is to provide a Faraday rotation angle varying apparatus capable of reducing a variation in characteristics by usually keeping constant a relationship between a Faraday rotation angle and applied external magnetic fields.

Another object of the present invention is to provide a Faraday rotation angle varying apparatus capable of reducing the DOP to a value of 10% or less by improving the symmetry and linearity of a diagram representing a relationship between an applied magnetic field variable in polarity and a Faraday rotation angle characteristic.

A further object of the present invention is to provide a Faraday rotation angle varying apparatus capable of allowing magnetization of a Faraday element to be easily directed in a variable magnetic field applying direction in spite of the fact that the Faraday element is applied with a fixed magnetic field and a variable magnetic field in two or more of directions.

Still a further object of the present invention is to provide a Faraday rotation angle varying apparatus capable of extending a variable range of a Faraday rotation angle more widely (typically, up to 90° or more) although a Faraday element is applied with a fixed magnetic field and a variable magnetic field in directions perpendicular from each other.

According to an aspect of the present invention, there is provided a Faraday rotation angle varying apparatus for controlling a Faraday rotation angle of a light beam passing through a garnet single crystal having a Faraday effect by applying external magnetic fields to the garnet single crystal in two or more of directions and varying a synthetic magnetic field synthesized from the external magnetic fields, wherein the garnet single crystal has the (111) plane polished and the light beam is allowed to pass through the garnet single crystal along the <111> direction of the garnet single crystal perpendicular to the (111) plane, and a displacement path of a synthetic vector of the external magnetic fields is within a fan-shaped range (peripheral lines of the fan-shape inclusive) of a stereographic projection chart of the garnet single crystal with the (111) plane taken as the center of the chart, the fan-shaped range being surrounded by two lines connecting a point indicating the (111) plane positioned at the center of the stereographic projection chart to two positions apart 10° rightward and leftward from a point indicating one of crystal planes equivalent to the (110) plane positioned on the outermost peripheral circle of the stereographic projection chart.

FIG. 1 is a stereographic projection chart of a garnet single crystal with the (111) plane taken as the center of the chart, in which adjacent concentric circles represent crystal planes offset 10° from each other and adjacent radial lines represent crystal planes offset 10° from each other. An arbitrary crystal plane of the garnet single crystal can be indicated as a point in this stereographic projection chart. On the outermost peripheral circle of the chart, there appear crystal planes equivalent to the (110) plane, which are arranged with a pitch of 60°. The fan-shaped ranges, each of which is surrounded by two lines connecting a point indicating the (111) plane positioned at the center of the chart to two positions apart 10° rightward and leftward from a point indicating one of crystal planes equivalent to the (110) plane positioned on the outermost peripheral circle of the chart, are shown as six hatched regions in the figure. In the hatched region (specified by the present invention) is not present any crystal plane equivalent to the (111) plane excluding the center, and also any crystal plane equivalent to the (100) plane. This is important in the present invention. For example, in the case of a polarization scrambler, since external magnetic fields are oscillated about 180°, a displacement path of a synthetic vector of the external magnetic fields may be specified to be within arbitrary two, of the six fan-shaped ranges, being symmetric 180° with respect to the center. In addition, the crystal planes equivalent to the (110) plane positioned on the outermost peripheral circle of the chart are the (–1 0 1) plane, (–1 1 0) plane, (0 1 –1) plane, (1 0 –1) plane, (1 –1 0) plane, and (0 –1 1) plane.

In terms of improvement of characteristics, a displacement path of a synthetic vector of external magnetic fields is desirably on a line connecting a point indicating the (111) plane at the center of a stereographic projection chart of a garnet single crystal with the (111) plane taken as the center to a point indicating one of crystal planes equivalent to the (110) plane positioned on the outermost peripheral circle of the chart; however, in terms of assembling accuracy and the like, the displacement path is preferably within a narrow fan-shaped range being surrounded by two lines apart 5° rightward and leftward from the above line. The garnet single crystal may be applied with external magnetic fields in the two directions parallel and perpendicular to the light beam direction. The strength of the external magnetic field in the direction perpendicular to the light beam direction may be kept constant and the strength of the magnetic field in the direction parallel to the light beam direction may be made variable. Alternatively, the strength of the external magnetic field in the direction parallel to the light beam direction may be kept constant and the strength of the external magnetic field in the direction perpendicular to the light beam direction may be made variable. In general, the fixed magnetic field may be applied using permanent magnets and the variable magnetic field may be applied using an electromagnet.

According to another aspect of the present invention, there is provided a Faraday rotation angle varying apparatus for controlling a Faraday rotation angle of a light beam passing through a Faraday element including a garnet single crystal having a Faraday effect by applying external magnetic fields to the Faraday element in two or more of directions and varying a synthetic magnetic field synthesized from the magnetic fields, wherein the light beam is rendered incident on the (111) plane of the garnet single crystal, and a displacement path of a synthetic vector of the external magnetic fields is within a fan-shaped range (peripheral lines of the fan-shape inclusive) of a stereographic projection chart of the garnet single crystal with the (111) plane taken as the center of the chart, the fan-shaped range being surrounded by two straight lines apart 20° rightward and leftward from a straight line connecting a point indicating the (111) plane positioned at the center of the stereographic projection chart to a point indicating one of crystal planes equivalent to the (100) plane.

The displacement path of the synthetic vector of the external magnetic fields is preferably within a fan-shaped range (peripheral lines of the fan-shape inclusive) of the stereographic projection chart of the garnet single crystal with the (111) plane taken as the center of the chart, the fan-shaped range being surrounded by two straight lines apart 10° rightward and leftward from the straight line connecting the point indicating the (111) plane positioned at the center of the stereographic projection chart to a point indicating one of crystal planes equivalent to the (100) plane.

FIG. 2 is a stereographic projection chart of a garnet single crystal with the (111) plane taken as the center of the chart, like the chart shown in FIG. 1. In this chart, there appear crystal planes equivalent to the (100) plane on a circle apart 55° from the center of the chart, which are arranged with a pitch of 120°. On the outermost peripheral circle, there appear crystal planes equivalent to the (211) plane at positions where lines connecting the point indicating the (111) plane at the center to points indicating crystal planes equivalent to the (100) plane cross the outermost peripheral circle. The fan-shaped ranges, each of which is surrounded by two straight lines apart 20° rightward and leftward from a straight line connecting a point indicating the (111) plane positioned at the center of the chart to a point indicating one of crystal planes equivalent to the (100) plane, are indicated as three hatched regions. In the hatched ranges (specified by the present invention) is not present any crystal plane equivalent to the (111) plane excluding the center of the chart. This is important in the present invention. Further, the cross-hatched regions each show a fan-shaped range spread 10° rightward and leftward from a straight line connecting the point indicating the (111) plane at the center to a point indicating one of crystal planes equivalent to the (100) plane. In addition, the crystal planes equivalent to the (100) plane positioned apart 55° from the center are the (001) plane, (010) plane, and (100) plane.

In terms of improvement of characteristics, a displacement path of a synthetic vector of external magnetic fields is desirably on a line connecting a point indicating the (111) plane at the center of a stereographic projection chart of a garnet single crystal with the (111) plane taken as the center to a point indicating one of crystal planes equivalent to the (100) plane; however, in terms of assembling accuracy and the like, the displacement path is preferably within a narrow fan-shaped range being spread 2° rightward and leftward from the above line, to thereby realize the best state. The garnet single crystal may be applied with external magnetic fields in the two directions parallel and perpendicular to the light beam direction. The strength of the external magnetic field in the direction perpendicular to the light beam direction may be kept constant and the strength of the magnetic field parallel to the light beam direction may be made variable. Alternatively, the strength of the external magnetic field in the direction parallel to the light beam direction may be kept constant and the strength of the external magnetic field in the direction perpendicular to the light beam direction may be made variable. In general, the fixed magnetic field may be applied using permanent magnets and the variable magnetic field may be applied using an electromagnet.

The garnet single crystal used in the present invention may be prepared by, for example, a liquid phase epitaxial (LPE) process, and may have a chemical composition expressed by $(RBi)_3(FeM)_5O_{12}$ or $(RBi)_3Fe_5O_{12}$, where R indicates one or more kinds of elements selected from rare earth elements including yttrium and M is one or more kinds of elements capable of being substituted for Fe. Specific examples of M may include Ga, In and Al. Further, the garnet single crystal may have a chemical composition expressed by $Y_3Fe_5O_{12}$. The garnet single crystal is preferably produced using the above LPE process in terms of productivity; however, it may be produced by a FZ (floating zone) process or a flux process.

The Faraday rotation angle varying apparatus of the present invention may be applied to an apparatus for controlling a Faraday rotation angle, such as a polarization scrambler or an optical attenuator.

BRIEF DESCRIPTION OF THE DRAWINGS

FIG. 6b is a graph showing measured results obtained using the measurement system shown in FIG. 6a;

FIG. 7b is measured results obtained using the measurement system shown in FIG. 7a;

DETAILED DESCRIPTION OF THE PREFERRED EMBODIMENTS

[Embodiment 1: Improvement of Faraday Rotation Angle Characteristic Depending on Magnetic Field]

Figure 6A:
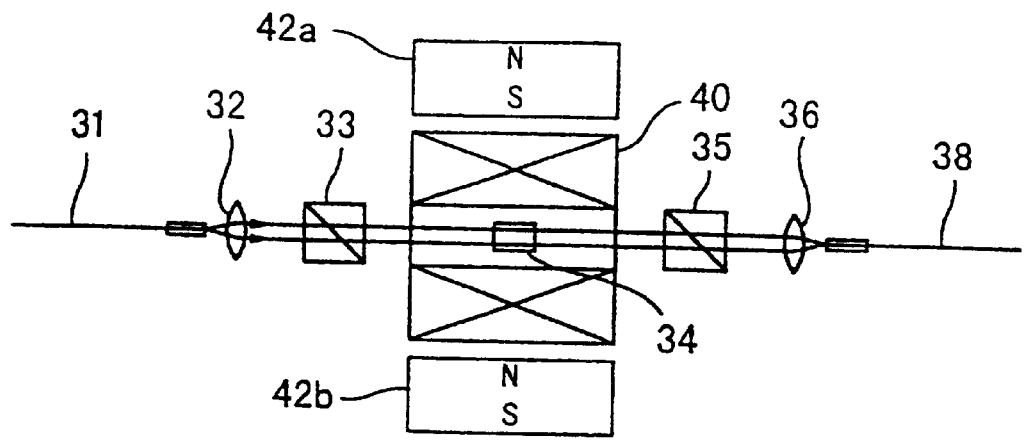
FIG. 6a is a measurement system corresponding to a polarization scrambler.
Figure 7A:
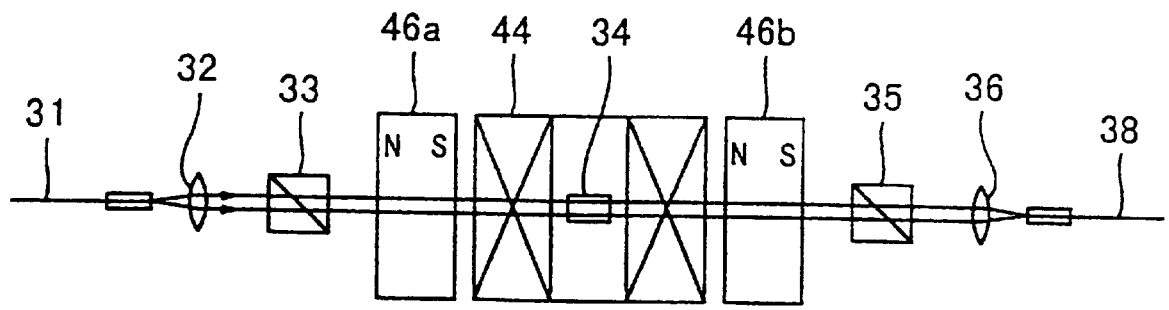
FIG. 7a is a measurement system corresponding to an optical attenuator.

To examine causes of a large variation in characteristics in each of a polarization scrambler and an optical attenuator, a garnet single crystal for forming a Faraday element was prepared, being assembled in each of two kinds of measurement systems shown in FIGS. 6a and 7a, and was measured in terms of a relationship between a Faraday rotation angle of the garnet single crystal and a magnetic field applied from an electromagnet.

The garnet single crystal was prepared in the following procedure. An LPE film of a Bi-substitution rare earth-iron garnet single crystal (composition: $Tb_{1.00}Y_{0.65}Bi_{1.35}Fe_{4.05}Ga_{0.95}O_{12}$, film thickness: 450 μm) was grown onto a (111) oriented substrate (lattice constant: 12.496 Å, composition: $(CaGd)_3(MgZrGa)_5O_{12}$) having a diameter of 1 inch and a thickness of 500 μm using PbO—$B_2O_3$—$Bi_2O_3$ as a flux. The LPE film formed on the substrate was cut into a size of 3 mm×3 mm, followed by removal of the substrate by polishing, and the resultant LPE film was heat-treated in atmospheric air at 1100° C. for 8 hours. The reason for carrying out heat-treatment is that the LPE film not heat-treated has a large uniaxial magnetic anisotropic constant due to growth induction. The LPE film was polished again into a square plate (3 mm×3 mm×0.324 mm) with the surface being mirror-finished, and antireflection coatings were applied to both outer faces of the LPE film. The LPE film was finally cut into a size of 1 mm×1 mm×0.324 mm (thickness "t" of crystal in FIG. 8=0.324 mm). By measurement of saturation magnetization using a VSM (vibrating sample magnetometer), it was proven that the saturation magnetization 4 πMs of the garnet single crystal was 120 gauss. In consideration of such a measured result, a fixed magnetic field applied from permanent magnets was set at 150 Oe to turn the garnet single crystal into a magnetic saturation state. Further, upon measurement of the Faraday rotation angle, a light beam was rendered incident on the garnet single crystal in the direction perpendicular to the surface deposited with the antireflection coatings, that is, the (111) plane of the garnet single crystal.

The measurement system shown in FIG. 6a has the same basic configuration as that of a polarization scrambler. Light outgoing from an optical fiber, 31 is collimated through a lens 32, to form parallel beams of light. The parallel beams of light pass through a polarizer 33, a garnet single crystal 34, and an analyzer 35, and are converged at an incident end of an optical fiber 38. The garnet single crystal 34 is applied with a saturation magnetic field in the direction perpendicular to the optical axis by a pair of permanent magnets 42a and 42b and is further applied with a magnetic field in the direction parallel to the optical axis by an electromagnet 40. A synthetic magnetic field synthesized from these magnetic fields is changed by varying a coil current flowing to the electromagnet 40. The insertion of the polarizer 33 and the analyzer 35 is to measure a Faraday rotation angle. The measurement system shown in FIG. 7a has the basic configuration as that of an optical attenuator. Light outgoing from an optical fiber 31 is collimated through a lens 32, to form parallel beams of light. The parallel beams of light pass through a polarizer 33, a garnet single crystal 34, and an analyzer 35, and are converged at an incident end of an optical fiber 38. The garnet single crystal 34 is applied with a saturation magnetic field in the direction parallel to the optical axis by a pair of permanent magnets 46a and 46b and is further applied with a magnetic field in the direction perpendicular to the optical axis by an electromagnet 44. A synthetic magnetic field synthesized from these magnetic fields is changed by varying a coil current flowing to the electromagnet 44.

Figure 6B:
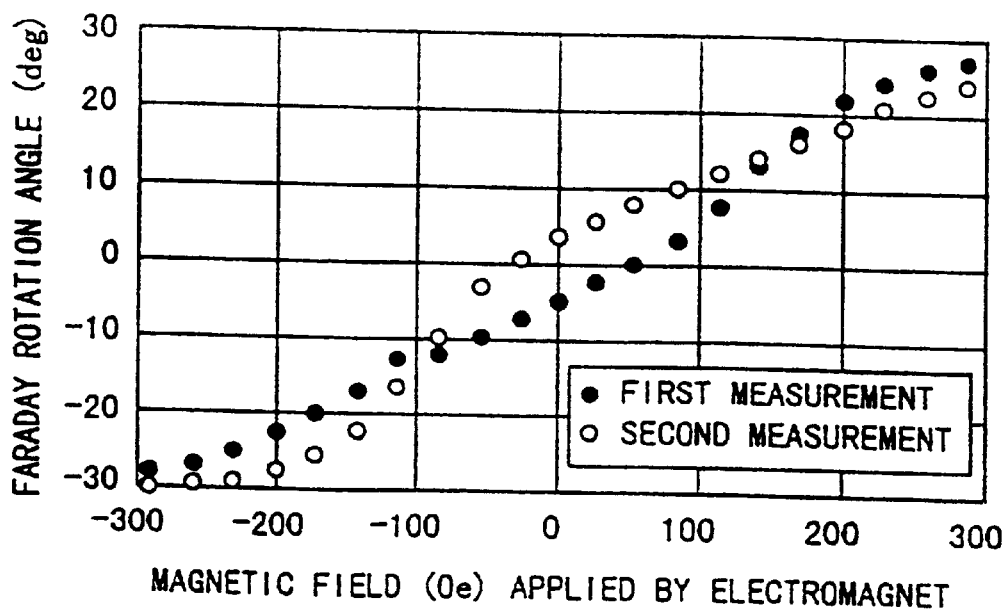
Figure 7B:
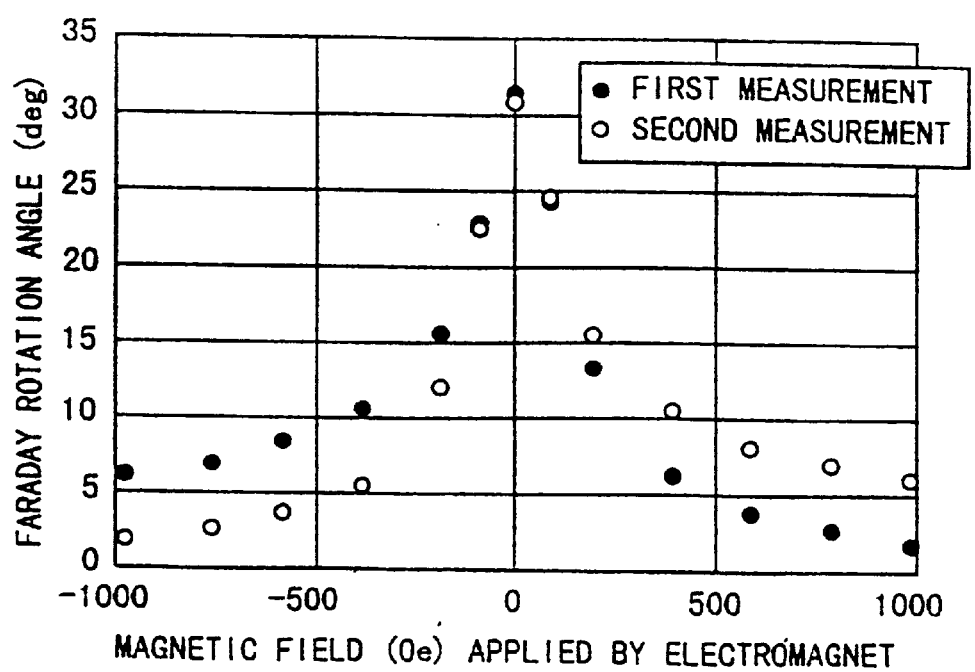

The Faraday rotation angle was measured twice using each of the measurement systems. After completion of the first measurement, the garnet single crystal was removed once from the measurement system, being assembled in the same measurement system again, and was subjected to the second measurement. As a light source, there was used a semiconductor laser having a wavelength of 1.55 μm. The results obtained using the measurement system shown in FIG. 6a are shown in FIG. 6b, and the results obtained using the measurement system shown in FIG. 7a are shown in FIG. 7b. From the results shown in these graphs, it is apparent that the first measured result is different from the second measured result. That is to say, even if the garnet single crystal is turned into the magnetic saturation state, the repeatability of the Faraday rotation angle depending on the applied magnetic fields cannot be obtained.

Figure 9:
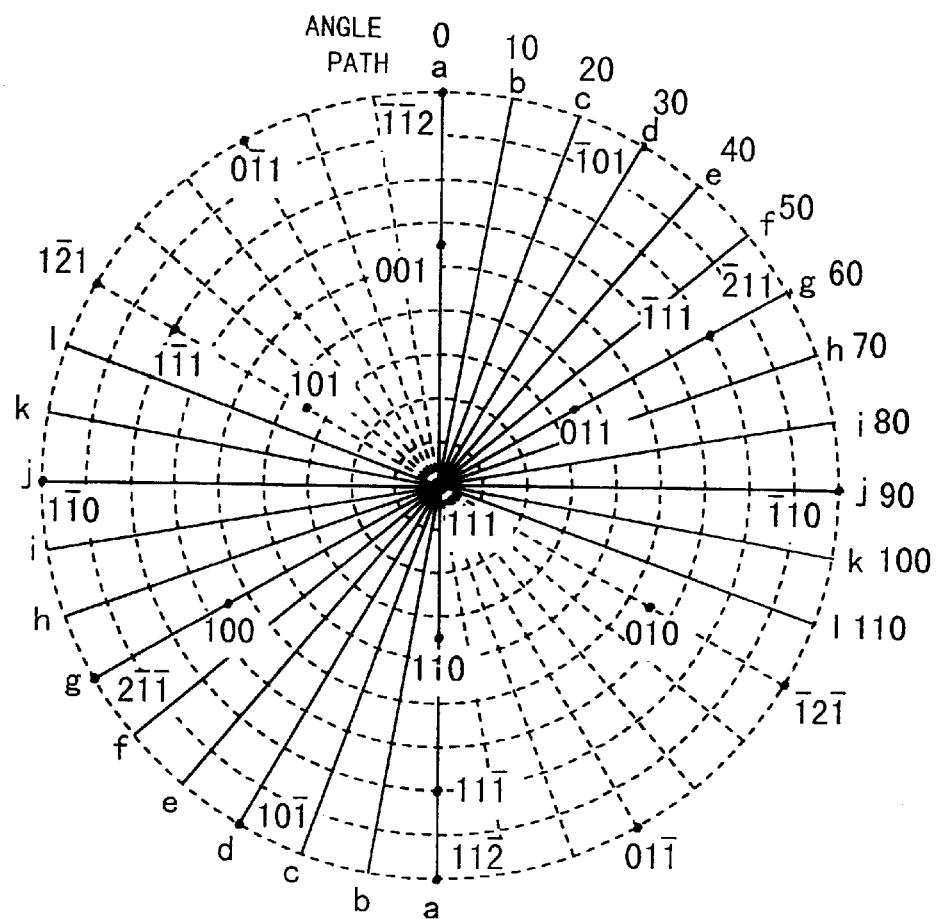
FIG. 9 is a stereographic projection chart showing paths and angles of a displacement vector of external magnetic fields.
Figure 10:
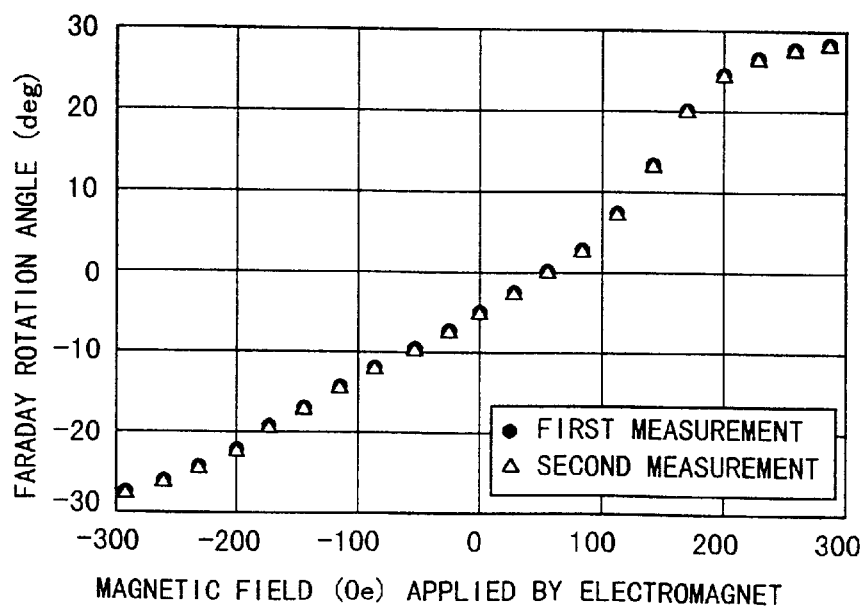
FIG. 10 is a graph showing a relationship between an external magnetic field and a Faraday rotation angle characteristic for a path "a" of the displacement vector of the external magnetic fields.
Figure 11A:
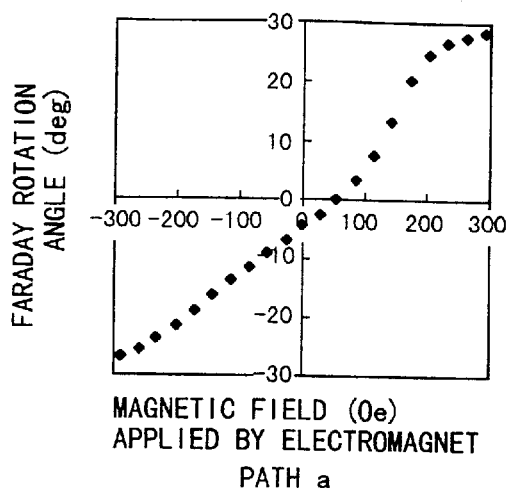
FIGS. 11a to 11f are graphs each showing a relationship between an external magnetic field and a Faraday rotation angle characteristic for each of paths "a" to "f"
Figure 11B:
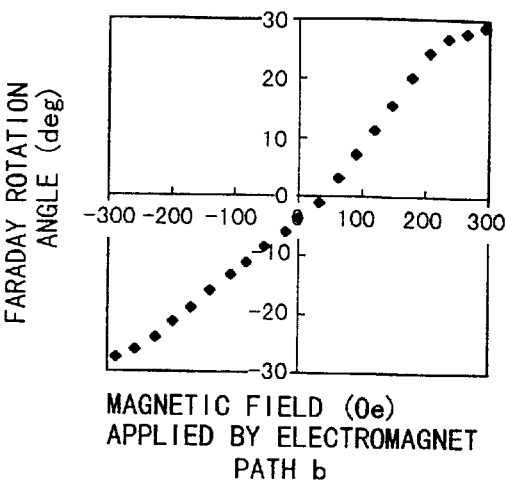
Figure 11C:
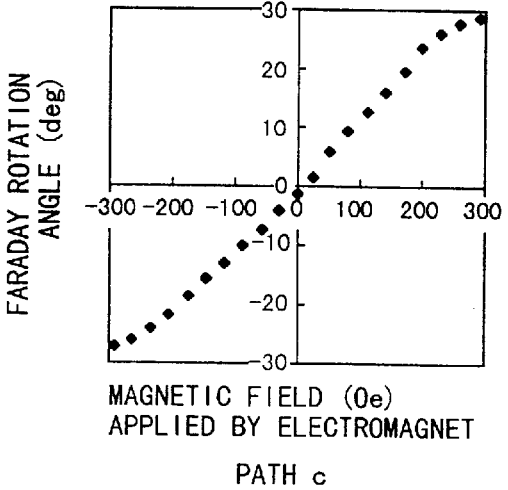
Figure 11D:
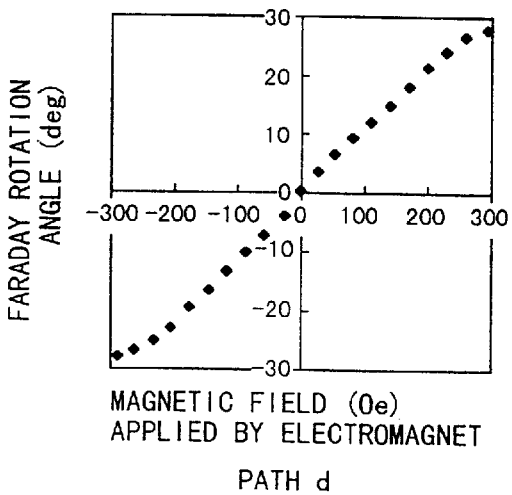
Figure 11E:
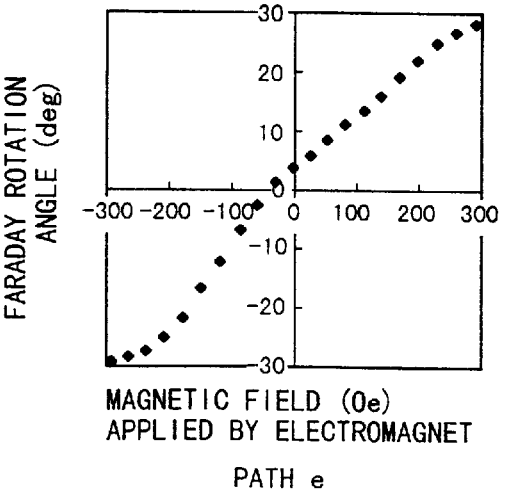
Figure 11F:
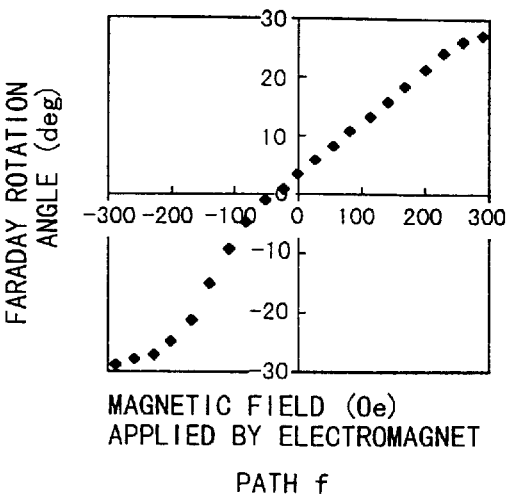
Figure 12A:
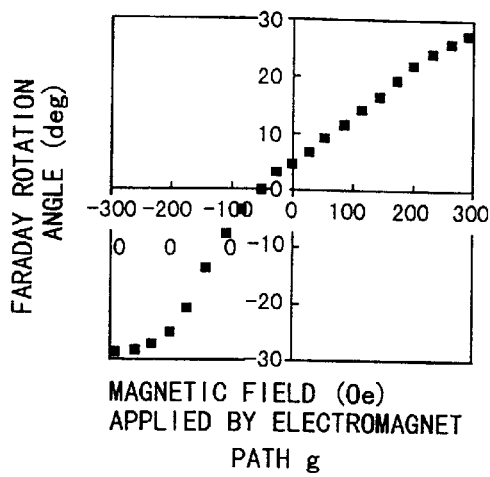
FIGS. 12a to 12f are graphs each showing a relationship between an external magnetic field and a Faraday rotation angle characteristic for each of paths "g" to "l"
Figure 12B:
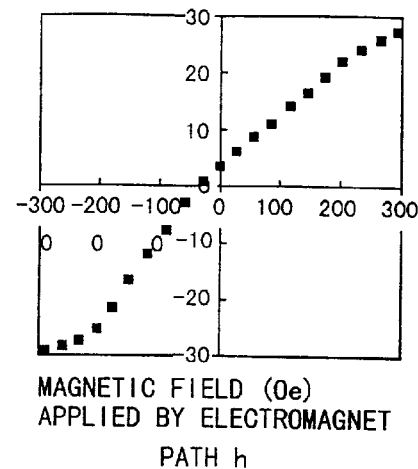
Figure 12C:
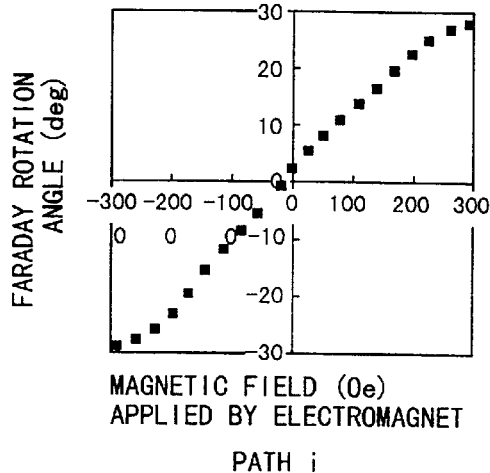
Figure 12D:
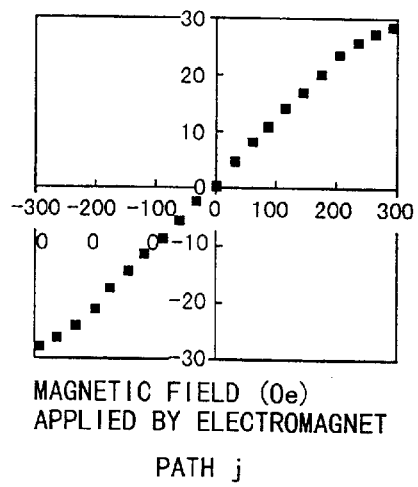
Figure 12E:
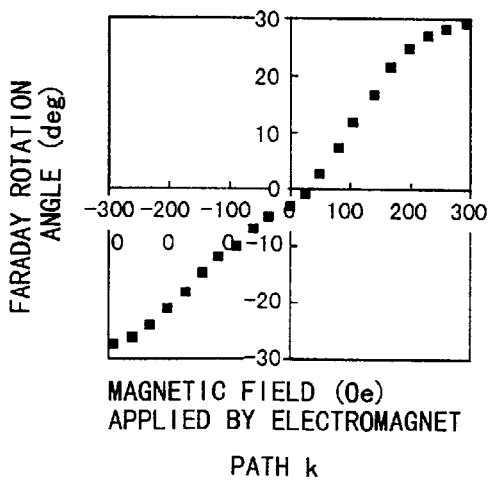
Figure 12F:
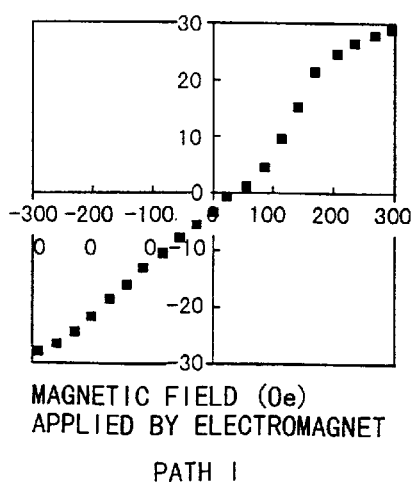

To examine causes of a variation in Faraday rotation angle, the crystal orientation of the garnet single crystal was examined by X-ray diffraction. As a result, it was revealed that planes A to E of a garnet single crystal shown in FIGS. 8a were equivalent to planes A' to E' in a stereographic projection chart shown in FIG. 8b. Thus, after specifying the crystal orientation of the garnet single crystal, the garnet single crystal was measured twice in terms of Faraday rotation angle in the same procedure as described above. First, the garnet single crystal was assembled into the measurement system shown in FIG. 6a with the plane B directed to the position of the S-pole of the permanent magnet and the plane D directed to the position of the N-pole of the opposed permanent magnet, and light beams were rendered incident on the garnet single crystal in the direction perpendicular to the plane A. By varying the magnetic field applied from the electromagnet, a synthetic vector of the magnetic fields applied from the permanent magnets and the electromagnet is applied to the garnet single crystal along a path "a" in the stereographic projection chart (see FIG. 9) of the garnet single crystal. Since magnetization of the garnet single crystal is directed in the <−1 −1 2> direction by the magnetic field applied from the permanent magnets and the magnetic field in the direction perpendicular to the paper plane on which the stereographic projection chart of FIG. 9 is depicted is applied to the garnet single crystal by the electromagnet, a synthetic vector of the magnetic fields should be naturally examined using a stereographic projection chart centered on the (112) plane. However, the path of the synthetic vector in the stereographic projection chart centered on the (112) plane is equivalent to the path in the stereographic projection chart centered on the (111) plane shown in FIG. 9, and accordingly, the path of the synthetic vector of the magnetic fields is shown by the path "a" in FIG. 9. The measured results are shown in FIG. 10. From the results shown in FIG. 10, it is apparent that the first measured result corresponds to the second measured result, and therefore, that the repeatability of the Faraday rotation angle can be improved by specifying the path of the synthetic vector of the magnetic fields applied to the garnet single crystal with respect to the crystal orientation of the garnet single crystal.

The characteristic line showing a change in Faraday rotation angle depending on an external magnetic field shown in FIG. 10, however, is asymmetric with respect to the origin, that is, poor in linearity. For this reason, the measurement was performed for the garnet single crystal by taking the above state as a reference state (0°) and turning, with the plane A kept perpendicular to the optical axis, the garnet single crystal 360° in 10° steps counterclockwise as seen from the incident side. The measured results in the case where the garnet single crystal is turned in 10° steps within a range of 0 to 110° are shown in FIGS. 11a to 11f and FIGS. 12a to 12f. The paths shown in FIGS. 11a to 11f correspond to the paths "a" to "f", shown in FIG. 9 and the paths shown in FIGS. 12a to 12f correspond to the paths "g" to "l" shown in FIG. 9. In addition, the measured results in the case where the garnet single crystal is turned within a range of 120 to 230° or within a range of 240 to 350° were the same as those in the case where the garnet single crystal is turned within a range of 0 to 110°, and therefore, the explanation thereof is omitted.

As a result, it becomes apparent that the symmetry, that is, the linearity of a change in Faraday rotation angle depending on the external magnetic fields is desirable in the case where the garnet single crystal is turned 30° or 90°, that is, in the case where the path of the applied magnetic fields is the path "d" or "j"; on the contrary, the symmetry, that is, the linearity of a change in Faraday rotation angle depending on the external magnetic fields is undesirable in the case where the garnet single crystal is turned 0° or 60°, that is, in the case where the path of the applied magnetic fields is the path "a" or "g".

The reason for this may be considered to be due to a crystal magnetic anisotropy of the garnet single crystal. The garnet single crystal naturally has a magnetocrystalline anisotropy Kc (which cannot be removed even by heat-treatment), and therefore, the <111> direction becomes the axis of easy magnetization, and the <100> direction becomes the axis of hard magnetization. Each of the paths "a" and "g" exhibiting the worst symmetry includes the easy magnetization axis <111> excluding the <111> direction at the center of the chart and also includes the hard magnetization axis <100>. The presence of the easy axis and the hard axis may be considered to exert adverse effect on the Faraday rotation angle and make poor the symmetry. On the contrary, each of the paths "d" and "j" exhibiting the good symmetry does not include both the easy axis and the hard axis and also is most remote from the easy axis and the hard axis. Therefore, each of the paths "d" and "j" is not affected by the easy axis and the hard axis, and is smoothly changed depending on external magnetic fields, resulting in the good symmetry.

In measurement of the path "a", when the magnetic field applied by the electromagnet is zero, only an external magnetic field in the direction perpendicular to the light beam direction is applied by the permanent magnets. Accordingly, the magnetization of the garnet single crystal should be perpendicular to the light beam direction, and thereby the Faraday rotation angle should be zero. However, the actually measured Faraday rotation angle is 5.3°. When the magnetization of the garnet single crystal is directed in the light beam direction, the Faraday rotation angle is 31.5° (see FIG. 7b), and consequently, the direction of the magnetization is tilted an angle θ with respect to the direction perpendicular to the light beam direction, the angle θ being given by θ=sin$^{-1}$ (5.3/31.5)=9.7°.

Figure 13:
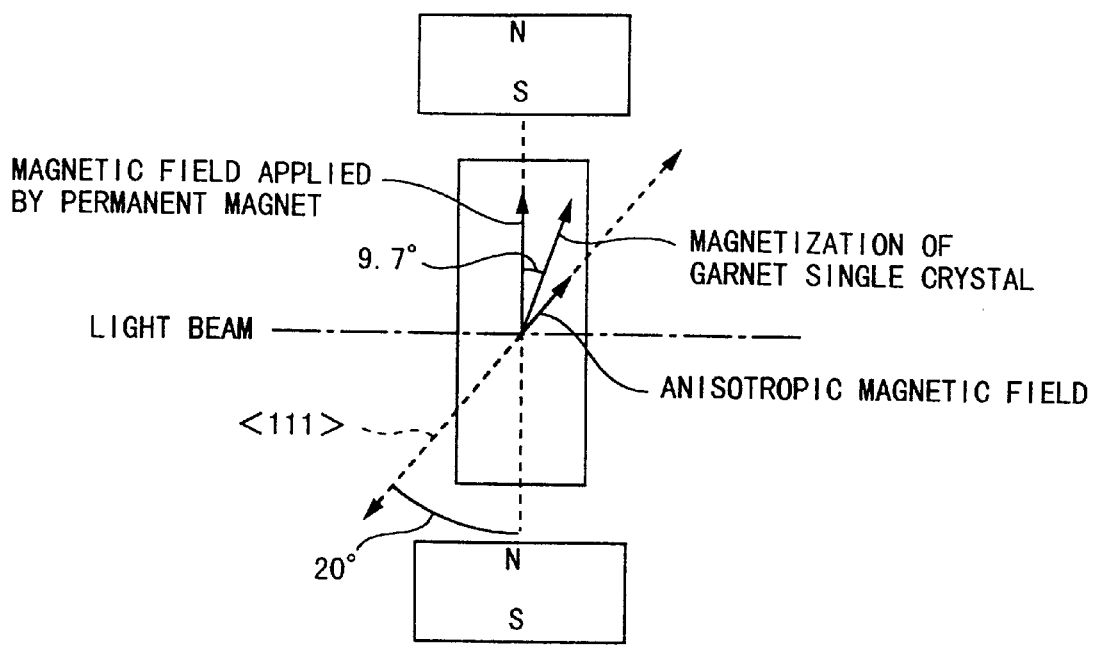
FIG. 13 is a diagram illustrating an effect of a crystal magnetic anisotropy of a garnet single crystal.
Figure 14:
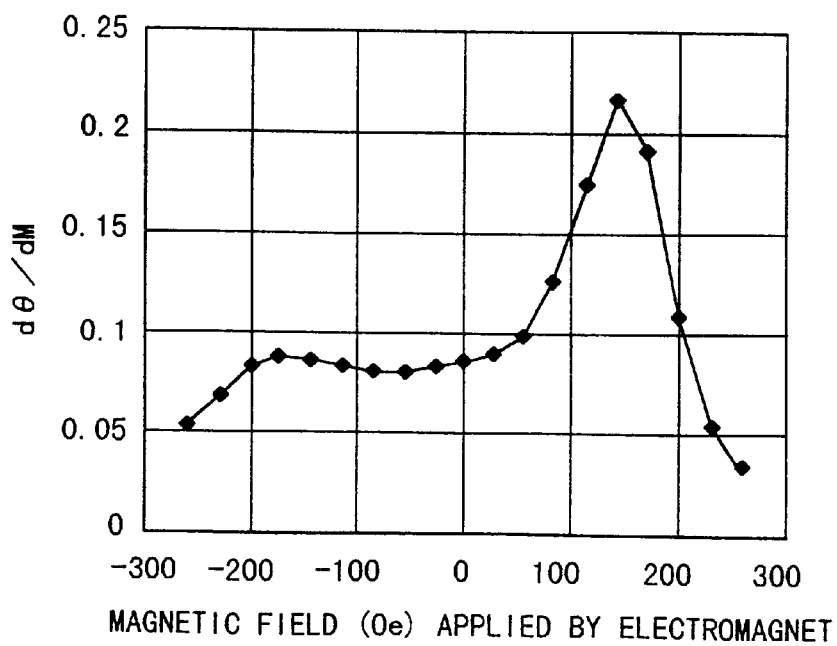
FIG. 14 is a graph showing a relationship between an external magnetic field and a change rate of a Faraday rotation angle for the path "a"

As shown in FIG. 13, the <111> direction (direction of the easy axis of magnetocrystalline anisotropy) is present at a position tilted 20° from the direction perpendicular to the light beam direction, so that the magnetization of the garnet single crystal is considered to be directed in the direction of a synthetic vector of the external magnetic field and the anisotropic magnetic field. This is the reason why the curve indicating the change in Faraday rotation angle depending on the external magnetic field does not pass through the origin, that is, poor in symmetry. FIG. 14 is a graph in which the measured result for the path "a" is expressed as the value of Faraday rotation angle differentiated in terms of magnetic field applied by the electromagnet. The differential value is maximized at a positive magnetic field of 140 Oe. This means that the synthetic vector of the applied magnetic fields is present near the hard magnetization axis <100>. The reason why the linearity of the Faraday rotation angle is poor may be considered to be due to the fact that the synthetic vector of the applied magnetic fields passes through a point near the hard magnetization axis. It is to be noted that the electromagnet is omitted in FIG. 13 for simplicity of description.

Polarization Scrambler According to Embodiment 1

Figure 15A:
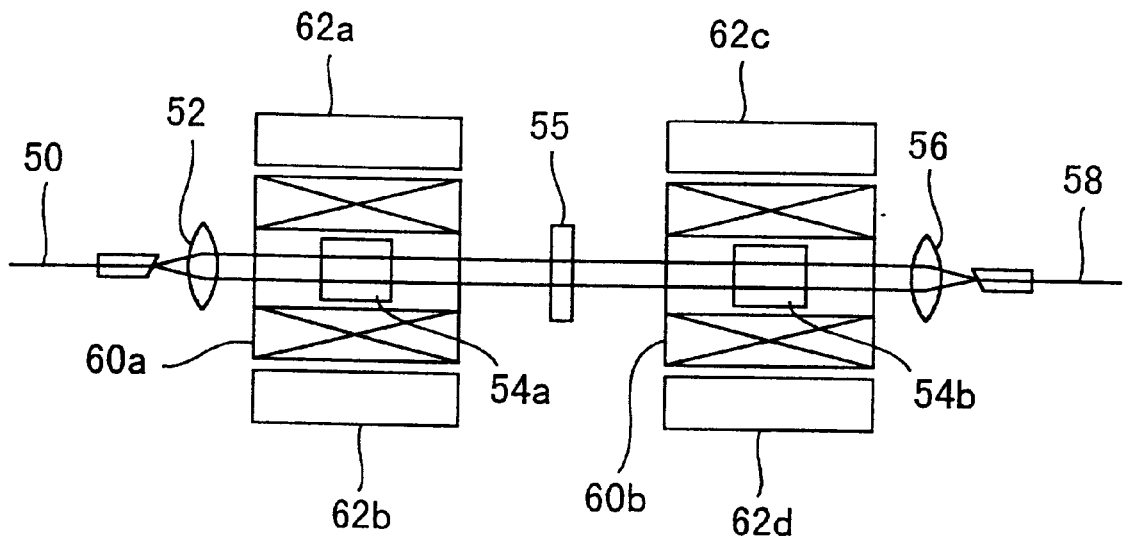
FIGS. 15a and 15b are views showing one embodiment of a polarization scrambler.
Figure 15B:
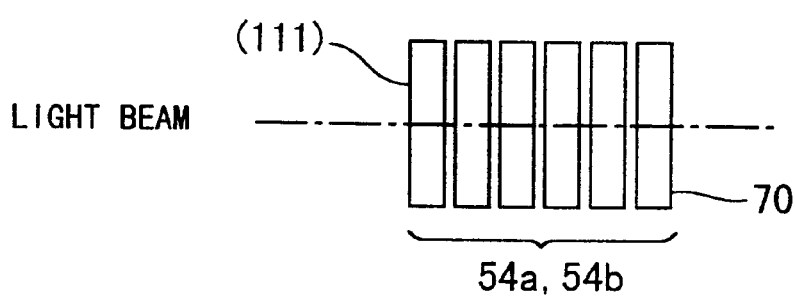

FIGS. 15a and 15b show one embodiment of a polarization scrambler according to the present invention, wherein FIG. 15a is a view showing the entire configuration of the polarization scrambler and FIG. 15b is a view illustrating a Faraday element used for the polarization scrambler shown in FIG. 15a. As shown in FIG. 15b, each of Faraday elements 54a and 54b is configured such that six pieces of garnet single crystals 70, each being prepared to exhibit a Faraday rotation angle in a range of 30±1° when the magnetization thereof is directed in the direction parallel to the light beam direction, are arranged with their orientations aligned. Each of the Faraday elements 54a and 54b having the above configuration exhibits a Faraday rotation angle of about 180° when the magnetization is directed in the direction parallel to the light beam direction. The light beam is allowed to enter each garnet single crystal 70 in the direction perpendicular to the (111) face. It is to be noted that the garnet single crystals 70 are depicted in a state being separated from each other for easy understanding; however, actually, they may be adhesively integrated to each other. Referring again to FIG. 15a, light outgoing from an optical fiber 50 is collimated through a lens 52, to form parallel beams of light. The parallel beams of light pass through the Faraday element 54a, a quarter-wave plate 55, and the Faraday element 54b, and are converged at an incident end of an optical fiber 58 through a lens 56. The Faraday elements 54a and 54b are applied with magnetic fields in the direction parallel to the optical axis by electromagnets 60a and 60b, respectively, and are also applied with magnetic fields in the direction perpendicular to the optical axis by a pair of permanent magnets 62a and 62b and a pair of permanent magnets 62c and 62d, respectively. By turning the Faraday elements 54a and 54b into magnetic saturation states by the permanent magnets 62a to 62d, and changing currents supplied to coils of the electromagnets 60a and 60b, a synthetic magnetic field is changed, to thereby continuously and periodically vary the polarization direction of the transmitted beams of light.

Seven pieces of polarization scramblers each having the above configuration were prepared for each of paths (paths "a" to "g") of synthetic magnetic fields applied to the Faraday elements. The DOP of each of these polarization scramblers was measured. The results are shown in Table 1.

TABLE 1

| path    | a  | b  | c | d | e | f  | g  |
|---------|----|----|---|---|---|----|----|
| DOP (%) | 30 | 15 | 8 | 2 | 8 | 15 | 30 |

From the results shown in Table 1, it is apparent that if the displacement path of the synthetic vector of the external magnetic fields is within the fan-shaped range of a stereographic projection chart of the garnet single crystal with the (111) plane taken as the center of the chart, the fan-shaped range being surrounded by lines connecting a point indicating the (111) plane at the center to two positions apart 10° rightward and leftward from a point indicating one of crystal planes equivalent to the (110) plane positioned on the outermost peripheral circle of the chart, the DOP is 10% or less and thereby the characteristics of the polarization scrambler are desirable. In consideration of the easy assemble based on the assembling accuracy and the DOP reduction effect, the displacement path of the synthetic vector of the external magnetic fields is preferably within the fan-shaped range of a stereographic projection chart of the garnet single crystal with the (111) plane taken as the center of the chart, the fan-shaped range being surrounded by lines connecting a point indicating the (111) plane at the center to two positions apart 5° rightward and leftward from a point indicating one of crystal planes equivalent to the (110) plane positioned on the outermost peripheral circle of the chart.

As described above, according to this embodiment of the present invention, the garnet single crystal has the (111) plane polished and the light beam is allowed to pass through the garnet single crystal along the <111> direction of the garnet single crystal perpendicular to the (111) plane; and a displacement path of a synthetic vector of the external magnetic fields is within a fan-shaped range of a stereographic projection chart of the garnet single crystal with the (111) plane taken as the center of the chart, the fan-shaped range being surrounded by two lines connecting a point indicating the (111) plane positioned at the center of the stereographic projection chart to two positions apart 10° rightward and leftward from a point indicating one of crystal planes equivalent to the (110) plane positioned on the outermost peripheral circle of the stereographic projection chart, and accordingly, it is possible to improve the repeatability of the Faraday rotation angle depending on the applied external magnetic fields and also improve the symmetry of the Faraday rotation angle when the direction of the applied external magnetic fields is reversed.

As a result, it is possible to suppress a variation in characteristics of the apparatus of controlling a Faraday rotation angle by applying a variable magnetic field to the garnet single crystal in one or more of directions and hence to improve the characteristics. To be more specific, it is possible to suppress a variation in characteristics of each of a polarization scrambler and optical attenuator, and also to make smaller the DOP of a polarization scrambler.

[Embodiment 2: Improvement of Variable Range of Faraday Rotation Angle]

The present inventors have earnestly studied a relationship between magnetic fields applied to a garnet single crystal and the Faraday rotation angle of the garnet single crystal, and found that as the crystal orientation of the garnet single crystal functioning as a Faraday element with respect to the direction of the external magnetic fields applied to the garnet single crystal, the variable range of the Faraday rotation angle is changed. To examine the reason for this, a garnet single crystal as a Faraday element was prepared, being assembled in the above-described measurement system shown in FIG. 4, and was measured in terms of Faraday rotation angle and optical attenuation of the garnet single crystal depending on the magnetic field applied from an electromagnet. The Faraday rotation angle was measured by a polarization modulation technique. The optical attenuation was measured in a state the polarizer and the analyzer were arranged such that polarization planes passing through the polarizer and the analyzer were crossed at 90°. Accordingly, when the polarization plane is turned 90° by the Faraday element, that is, when the Faraday rotation angle is 90°, the incident light passes through the analyzer with little loss; however, when the Faraday rotation angle is 0°, the light cannot pass through the analyzer because the polarization plane is perpendicular to the analyzer. Each of the polarizer and analyzer is a composite polarizing prism. Also, an angle formed between the polarization plane passing through the polarizer and the magnetic field applied by the electromagnet in the direction perpendicular to the optical axis was set at 10° or less to prevent deterioration of the extinction ratio due to the differential phase caused by Cotton-Mouton effect. A magnetic field of 150 Oe was applied in the direction along the optical axis by permanent magnets, and a magnetic field of 1000 Oe at maximum was applied in the direction perpendicular to the optical axis by an electromagnet.

The garnet single crystal for forming a Faraday element was prepared in the same manner as that described in Embodiment 1. However, the thickness of the crystal was different from that in Embodiment 1 (t=0.31 mm in FIG. 8a).

Figure 8A:
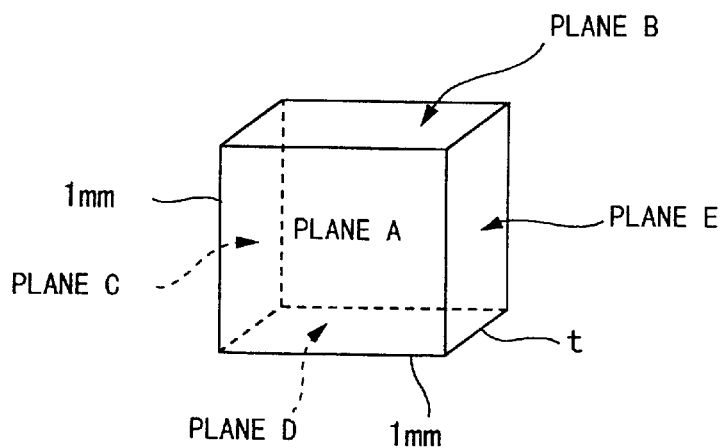
FIG. 8a is a view showing actual crystal planes of a garnet single crystal.
Figure 8B:
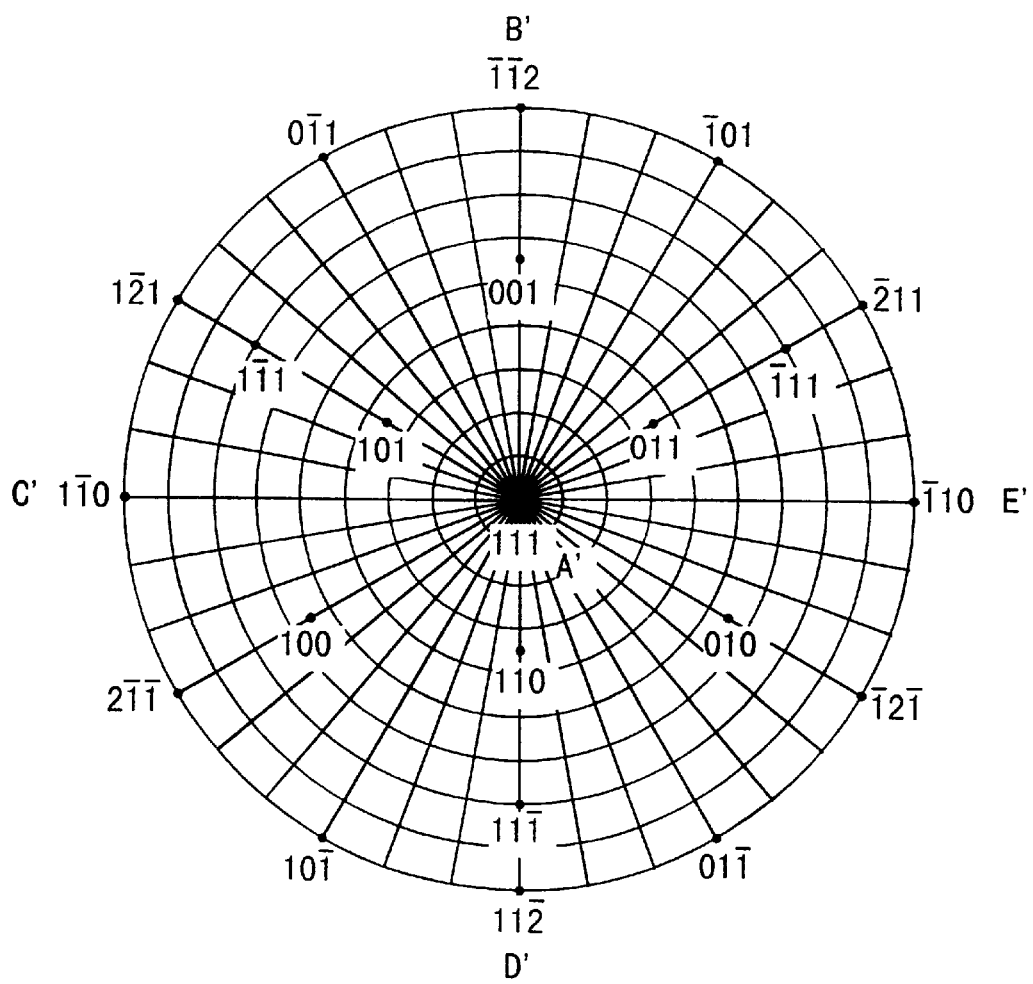
FIG. 8b is a stereographic projection chart of the garnet single crystal with the (111) plane taken as the center.
Figure 16:
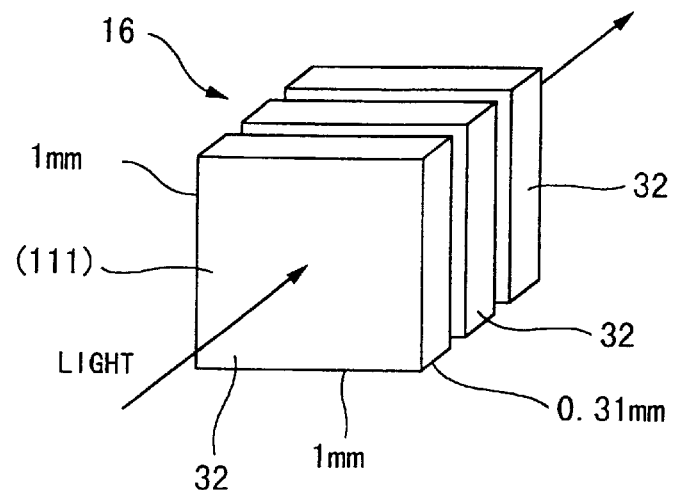
FIG. 16 is a view illustrating one example of a Faraday element.

As a result of examining the crystal orientation of the garnet single crystal by X-ray diffraction, it was revealed that planes A to E of the garnet single crystal 32 shown in FIG. 8a were equivalent to the planes A' to E' in the stereographic projection chart shown in FIG. 8b. As shown in FIG. 16, three garnet single crystals 32 were arranged with the orientations aligned, to form a Faraday element 16. The Faraday element 16 was disposed in such a manner as to receive beams of light in the direction shown by an arrow in FIG. 16. The measurement was performed for each of paths "a" to "l" (in a range of 0 to 110° in FIG. 17) of a synthetic vector of the magnetic fields applied from the permanent magnets and the electromagnet. For example, each garnet single crystal was assembled in the measurement system shown in FIG. 4 in a state in which the S-pole of the permanent magnet was disposed on the light incident plane (plane A) side; the N-pole of the permanent magnet was disposed on the light outgoing plane (back plane reversed to plane A) side; the plane B was directed to the position of the S-pole of the electromagnet; and the plane D was directed to the position of the N-pole of the electromagnet. In this state, beams of light were rendered incident on the garnet single crystal in the direction perpendicular to the plane A. By varying the magnetic field applied from the electromagnet, the synthetic vector of the magnetic fields by the permanent magnets and the electromagnet is applied to the garnet single crystal along the path "a" in the stereographic projection chart (see FIG. 17) of the garnet single crystal.

Figure 17:
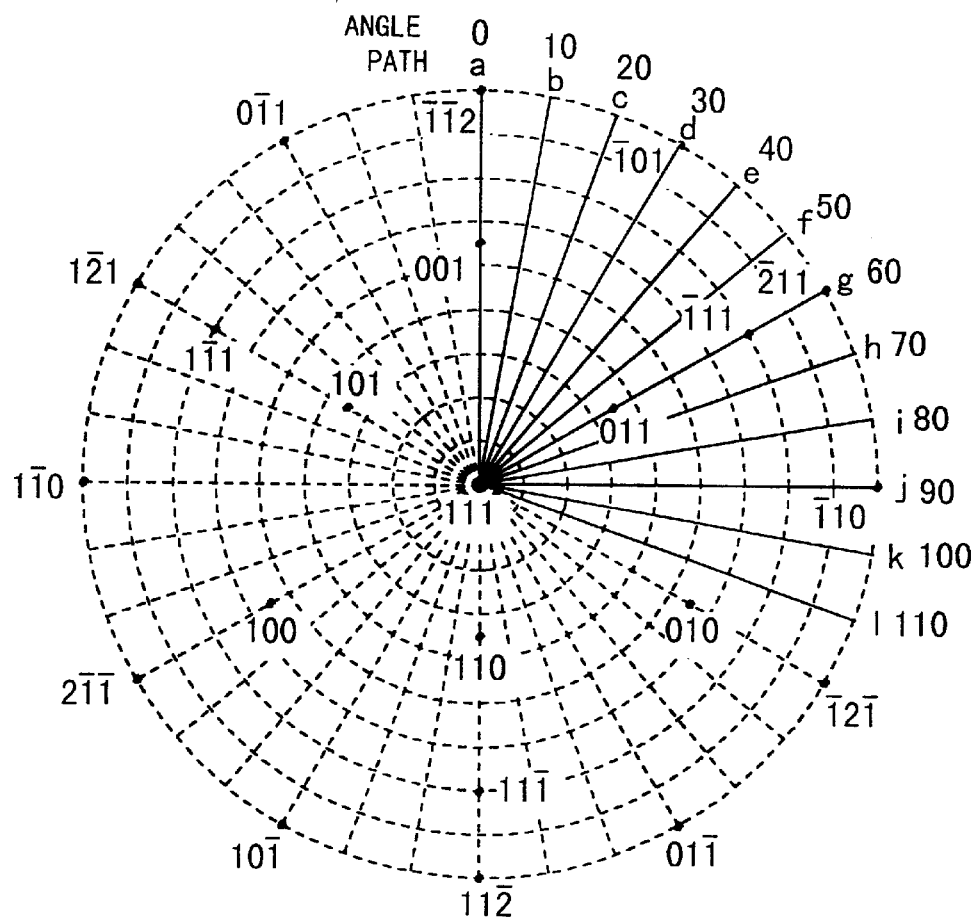
FIG. 17 is a stereographic diagram showing paths and angles of a displacement vector of external magnetic fields.

A difference between the maximum value and the minimum value of the Faraday rotation angle, that is, the variable range (degree) and the maximum optical attenuation (dB) were measured by taking the path "a" shown in FIG. 17 as a reference state (0°) and turning, with the plane A of the garnet single crystal kept perpendicular to the optical axis, the garnet single crystal 360° in 10° steps counterclockwise as viewed on the incident side. The magnetic field applied from the permanent magnets was set at 150 Oe, and the magnetic field applied from the electromagnet was set at 1000 Oe at maximum. The measured results for the paths "a" to "l" are shown in Table 2. In addition, although the measurement was performed for the paths in a range of 120 to 230° and for the paths in a range of 240 to 350°, the measured results are the same as those for the paths in a range of 0 to 1100 shown in Table 2, and therefore, the explanation thereof is omitted.

TABLE 2

| angle | path | Faraday rotation angle (degree) | | variable range | max. optical attenuation (dB) |
|---|---|---|---|---|---|
| | | maximum | minimum | | |
| 0   | a | 90.0 | −3.0 | 93.0 | 36 |
| 10  | b | 90.0 | 0.0  | 90.0 | 36 |
| 20  | c | 90.0 | 3.1  | 86.9 | 26 |
| 30  | d | 90.0 | 6.0  | 84.0 | 20 |
| 40  | e | 90.0 | 9.9  | 80.1 | 16 |
| 50  | f | 90.0 | 14.7 | 75.3 | 13 |
| 60  | g | 90.0 | 19.6 | 70.4 | 10 |
| 70  | h | 90.0 | 15.5 | 74.5 | 12 |
| 80  | i | 90.0 | 9.7  | 80.3 | 16 |
| 90  | j | 90.0 | 6.6  | 83.4 | 20 |
| 100 | k | 90.0 | 3.8  | 86.2 | 24 |
| 110 | l | 90.0 | 0.0  | 90.0 | 36 |

As is apparent from the results shown in Table 2, the variable range of the Faraday rotation angle is maximized, specifically, 90° or more at the turned angle of 0° (that is, for the path "a" of the applied magnetic fields); on the contrary, the variable range of the Faraday rotation angle is minimized, specifically, about 70° at the turned angle of 60° (that is, for the path "g" of the applied magnetic fields). Further, as is apparent from the results shown in Table 2, the maximum optical attenuation is 24 dB or more in a range offset 20° or less from the path "a", and therefore, a desirable attenuation characteristic is obtained in such a range. In particular, since the variable range of the Faraday rotation angle is 90° or more in a range offset 10° or less from the path "a", and therefore, a very desirable attenuation characteristic is obtained in such a range. Accordingly, it is of course preferable to dispose the garnet single crystal with a synthetic vector of applied external magnetic fields directed along the path "a". In consideration of the assembling accuracy, it is most preferable to set the direction of a synthetic vector of applied external magnetic fields in a range offset ±2° from the path "a".

Figure 18A:
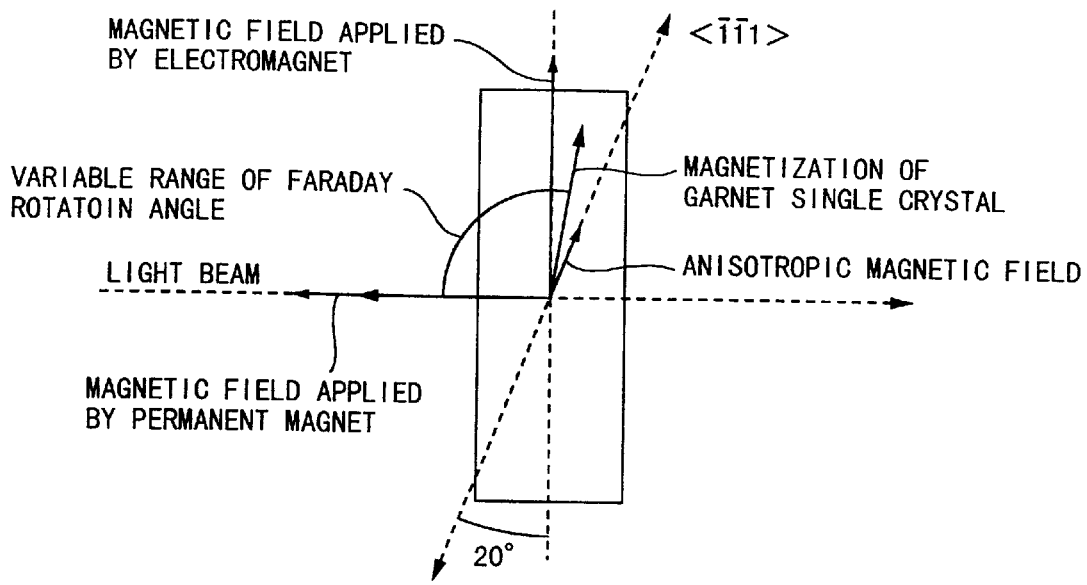
FIGS. 18a and 18b are diagrams showing an effect of a crystal magnetic anisotropy of a garnet single crystal for the paths "a" and "g", respectively.
Figure 18B:
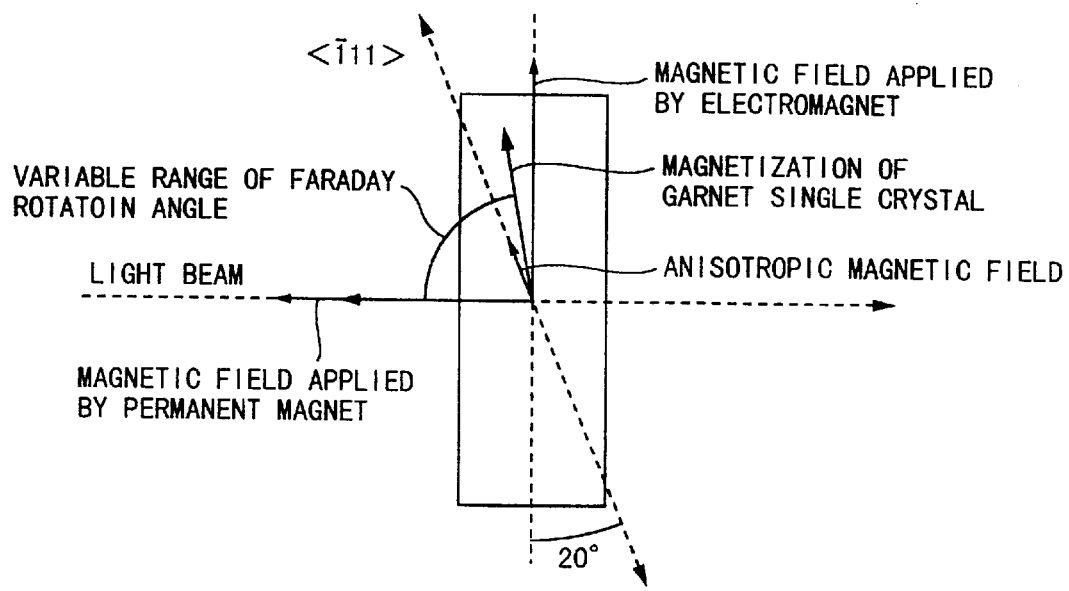

The reason for this may be considered to be due to the magnetocrystalline anisotropy of the garnet single crystal. The garnet single crystal naturally has a crystal magnetic anisotropy Kc (which cannot be removed even by heat-treatment), and a direction symmetric and equivalent to the <111> direction becomes the axis of easy magnetization. The <111> direction is parallel to the light beam direction and is also offset 20° from the direction perpendicular to the light beam direction. The magnetization of the garnet single crystal is affected by the anisotropic magnetic field and is directed in the direction of the synthetic vector of the external magnetic field and the anisotropic magnetic field. That is, in the case of the path "a" (0°), each magnetic field is in a relation shown in FIG. 18a, that is, attracted by the anisotropic magnetic field, so that the magnetization of the garnet single crystal exceeds the magnetic field applied from the electromagnet and approaches the direction of the anisotropic magnetic field. As a result, the variable range of the Faraday rotation angle is 90° or more. On the contrary, for the path "g" (60°), each magnetic field is in a relationship shown in FIG. 18b, that is, attracted by the anisotropic magnetic field, so that the magnetization of the garnet single crystal does not reach the direction of the electromagnet. As a result, the variable range of the Faraday rotation angle is minimized.

Optical Attenuator According to Embodiment 2

Figure 1:
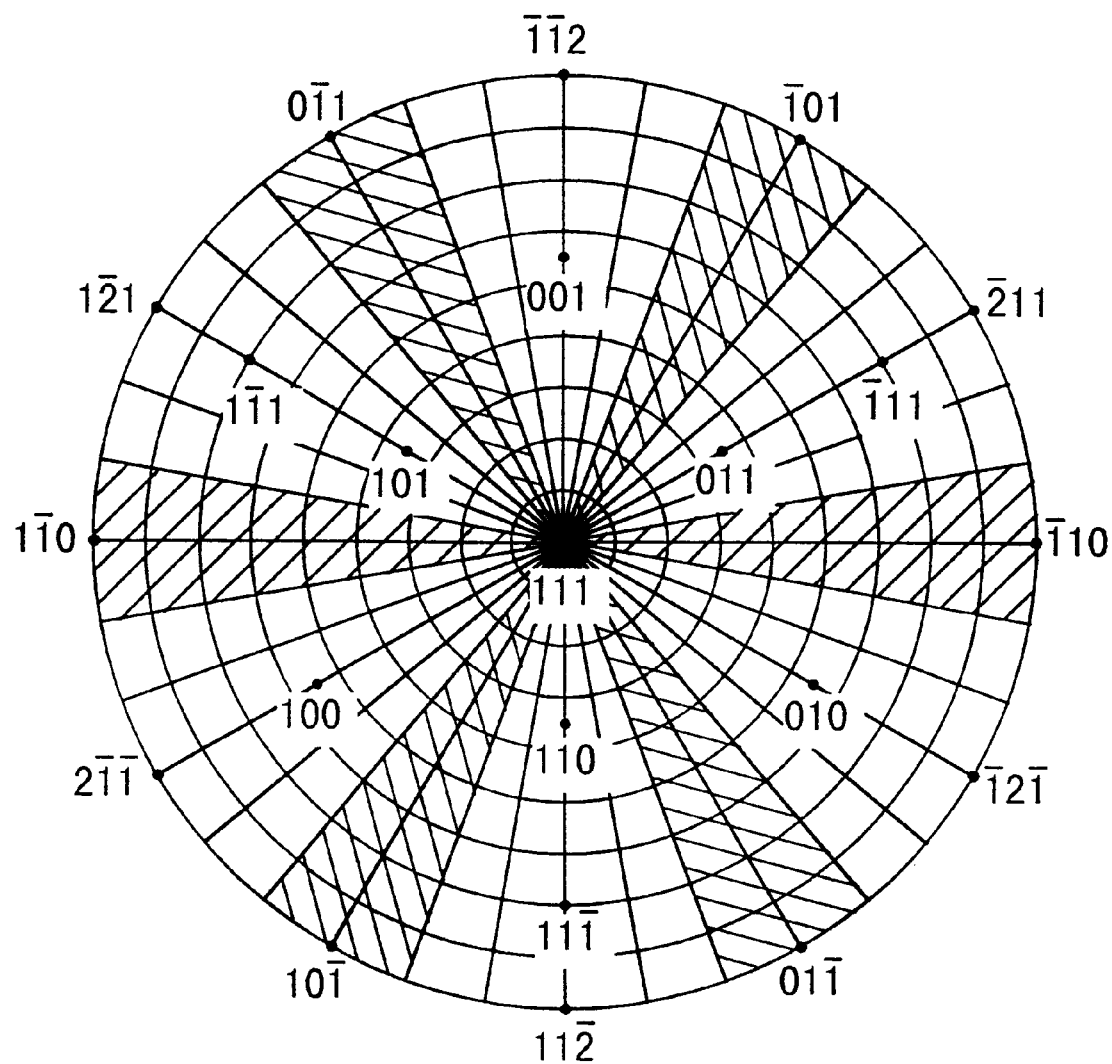
FIG. 1 is a stereographic projection chart of a garnet single crystal with the (111) plane taken as the center, showing a specific range according to one embodiment of the present invention.
Figure 2:
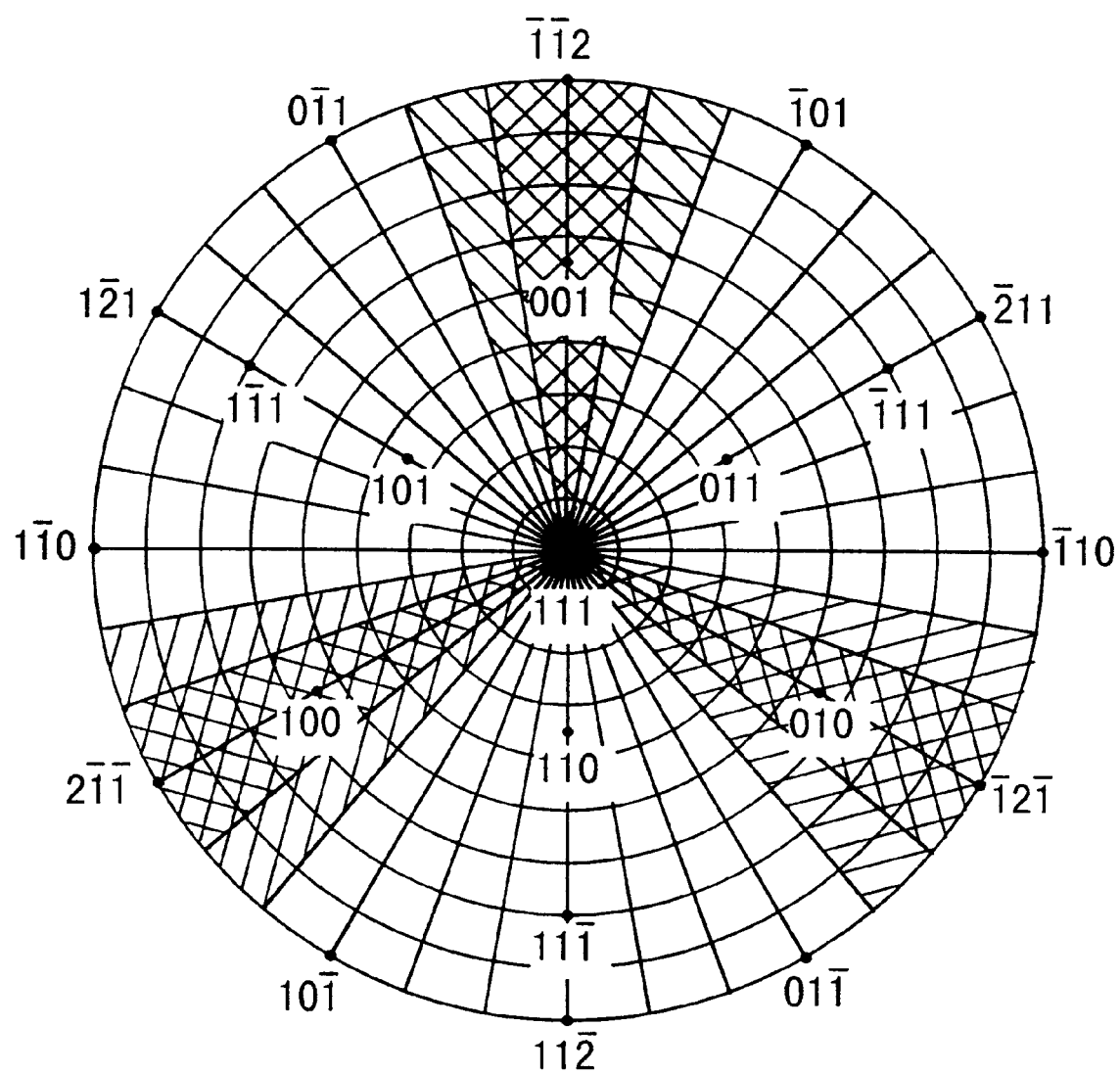
FIG. 2 is a stereographic projection chart of a garnet single crystal with the (111) plane taken as the center, showing a specific range according to another embodiment of the present invention.
Figure 3:
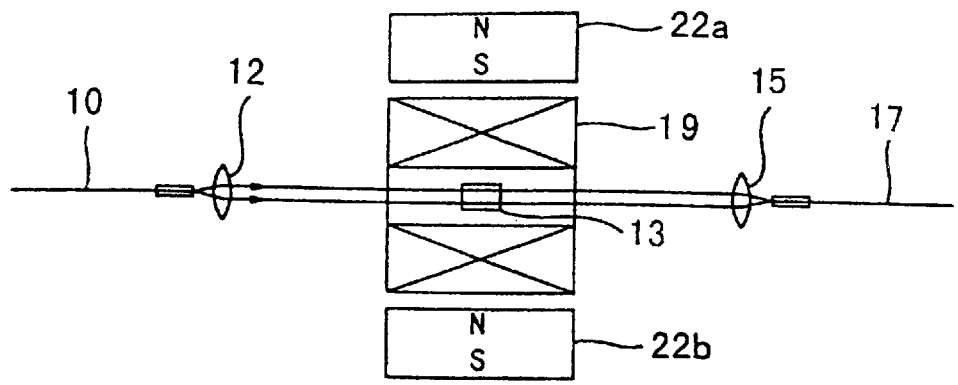
FIG. 3 is a view showing the basic configuration of a polarization scrambler.
Figure 4:
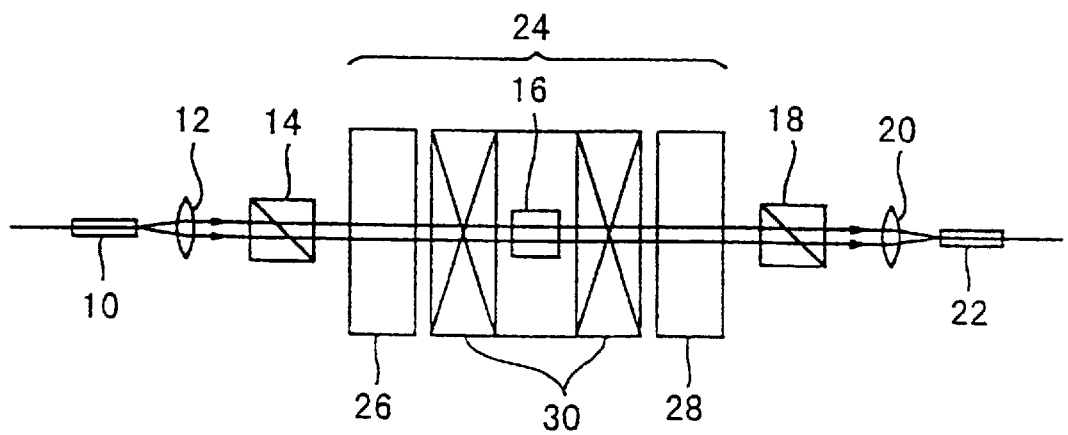
FIG. 4 is a view showing the basic configuration of an optical attenuator.
Figure 5:
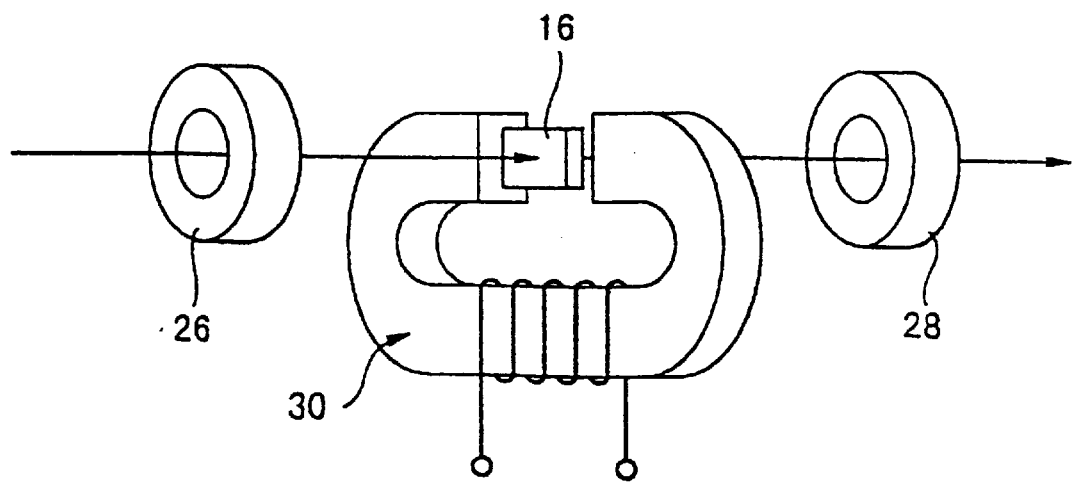
FIG. 5 is a view showing one example of the structure of the optical attenuator.

An optical attenuator of the present invention having the same configuration as that shown in FIGS. 4 and 5 was prepared. The Faraday element 16 shown in FIG. 16 was used in which the three garnet single crystals 32 were arranged with the orientations thereof aligned such that the Faraday rotation angle of the Faraday element 16 was set at about 90°. The reason why three pieces of the garnet single crystals are used is that the film thickness of the crystal is 450 µm and is further thinned by the subsequent processing, with a result that a Faraday rotation angle per one crystal is small. At present, it is difficult to grow a garnet single crystal having a thickness more than 500 µm without occurrence of defects and/or cracks by the LPE process. If a garnet single crystal having a thickness of 500 µm or more can be formed by the advance of the growth technology and the Faraday rotation angle for each crystal can be made larger by increasing the thickness of the finished single crystal, the number of the garnet single crystals may be set at two or less. In addition, beams of light are set to pass through the garnet single crystal 32 in the direction perpendicular to the (111) plane. The garnet single crystals 32 are depicted as separated from each other; however, actually, they may be adhesively integrated to each other. Referring again to FIG. 4, light outgoing from an optical fiber 10 is collimated through a lens 12, to form parallel beams of light. The parallel beams of light pass through a polarizer 14, the Faraday element 16, and an analyzer 18, and are converged at an incident end of an optical fiber 22. The Faraday element 16 is applied with a magnetic field parallel to the optical axis by permanent magnets 26 and 28 and also applied with a magnetic field perpendicular to the optical axis by an electromagnet 30. The polarization direction of the transmitted beams of light is continuously changed by turning the Faraday element 16 into a magnetic saturation state by the permanent magnets 26 and 28, and changing a current flowing in a coil of the electromagnet 30 to vary a synthetic magnetic field.

Figure 19:
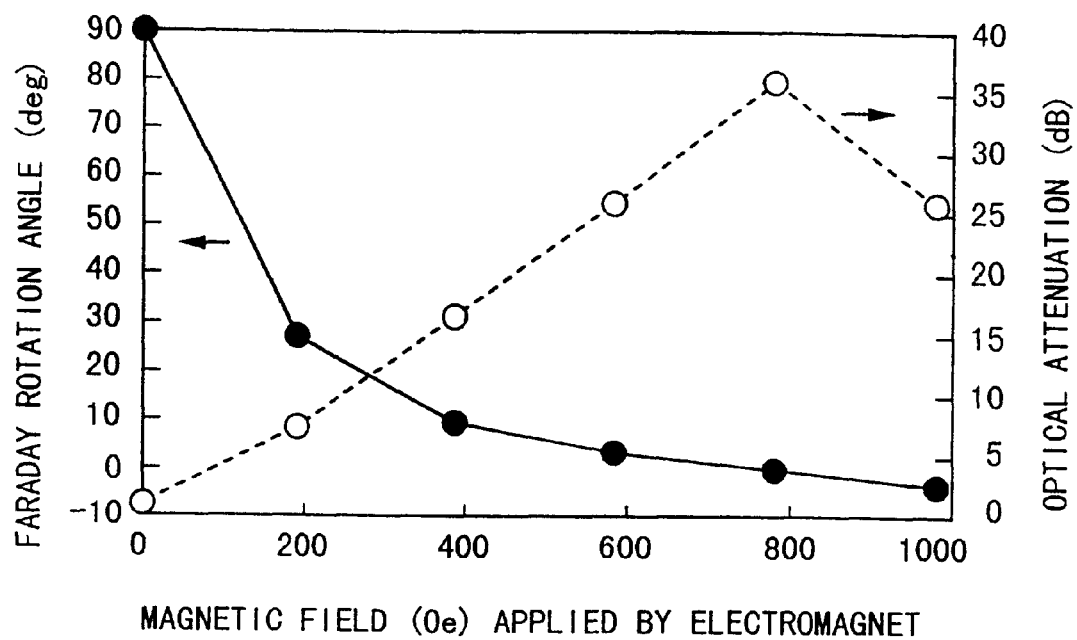
FIG. 19 is a graph showing a Faraday rotation angle and an optical attenuation depending on a magnetic field applied from an electromagnet according to the best mode of the present invention.

In the optical attenuator in this embodiment, the path of the magnetic fields applied to each garnet single crystal 32 of the Faraday element 16 is set in the best mode, that is, at the path "a" shown in FIG. 17. For such an optical attenuator, the Faraday rotation angle and the optical attenuation depending on the strength of the magnetic field applied from the electromagnet 30 were measured. The results are shown in FIG. 19. As is apparent from the results shown in FIG. 19, the optical attenuator thus obtained exhibits preferable characteristics that the variable range of the Faraday rotation angle is 90° or more and the maximum attenuation is 36 dB or more.

As described above, according to this embodiment of the present invention, light is rendered incident on the (111) plane of a garnet single crystal, and a displacement path of a synthetic vector of the external magnetic fields is within a fan-shaped range of a stereographic projection chart of the garnet single crystal with the (111) plane taken as the center of the chart, the fan-shaped range being spread 20° rightward and leftward from a straight line connecting a point indicating the (111) plane positioned at the center of the stereographic projection chart to a point indicating one of crystal planes equivalent to the (100) plane, and accordingly, the magnetization of a Faraday element is easily directed in the direction perpendicular to the optical axis even if the magnetic field is applied from permanent magnets in the direction parallel to the optical axis and the magnetic field is applied from an electromagnet in the direction perpendicular to the optical axis. As a result, the Faraday rotation angle varying apparatus of the present invention has an effect of spreading the variable range of the Faraday rotation angle.

In particular, by setting a displacement path of a synthetic vector of the external magnetic fields to be within a fan-shaped range of a stereographic projection chart of the garnet single crystal with the (111) plane taken as the center of the chart, the fan-shaped range being spread 10° rightward and leftward from a straight line connecting a point indicating the (111) plane positioned at the center of the stereographic projection chart to a point indicating one of crystal planes equivalent to the (100) plane, the variable range of the Faraday rotation angle can be 90° or more. As a result, the characteristics of the optical attenuator can be improved.

What is claimed is:

1. A Faraday rotation angle varying apparatus for controlling a Faraday rotation angle of a light beam passing through a garnet single crystal having a Faraday effect by applying external magnetic fields to said garnet single crystal in two or more of directions and varying a synthetic magnetic field synthesized from the external magnetic fields, wherein:

said garnet single crystal has the (111) plane polished and the light beam is allowed to pass through said garnet single crystal along the <111> direction of said garnet single crystal perpendicular to the (111) plane; and a displacement path of a synthetic vector of the external magnetic fields is within a fan-shaped range of a stereographic projection chart of said garnet single crystal with the (111) plane taken as the center of said chart, said fan-shaped range being surrounded by two lines connecting a point indicating the (111) plane positioned at the center of said stereographic projection chart to two positions apart 10° rightward and leftward from a point indicating one of crystal planes equivalent to the (110) plane positioned on the outermost peripheral circle of said stereographic projection chart.

2. A Faraday rotation angle varying apparatus according to claim 1, wherein the displacement path of the synthetic vector of the external magnetic fields is within a fan-shaped range of said stereographic projection chart of said garnet single crystal with the (111) plane taken as the center of said chart, said fan-shaped range being surrounded by two lines connecting the point indicating the (111) plane positioned at the center of said stereographic projection chart and two positions apart 5° rightward and leftward from a point indicating one of the crystal planes equivalent to the (110) plane positioned on the outermost peripheral circle of said stereographic projection chart.

3. A Faraday rotation angle varying apparatus according to claim 1, wherein said garnet single crystal is applied with external magnetic fields in two directions parallel and perpendicular to the light beam direction.

4. A Faraday rotation angle varying apparatus according to claim 3, wherein the strength of the external magnetic field applied in the direction perpendicular to the light beam direction is kept constant and the strength of the magnetic field applied in the direction parallel to the light beam direction is made variable.

5. A Faraday rotation angle varying apparatus according to claim 3, wherein the strength of the external magnetic field applied in the direction parallel to the light beam direction is kept constant and the strength of the external magnetic field applied in the direction perpendicular to the light beam direction is made variable.

6. A Faraday rotation angle varying apparatus according to claim 1, wherein said garnet single crystal is prepared by a liquid phase epitaxial method and has a chemical composition expressed by $(RBi)_3(FeM)_5O_{12}$ or $(RBi)_3Fe_5O_{12}$ where R indicates one or more kinds of elements selected from rare earth elements including yttrium and M is one or more kinds of elements capable of being substituted for Fe.

7. A Faraday rotation angle varying apparatus according to claim 1, wherein said garnet single crystal has a chemical composition expressed by $Y_3Fe_5O_{12}$.

8. A Faraday rotation angle varying apparatus for controlling a Faraday rotation angle of a light beam passing through a Faraday element including a garnet single crystal having a Faraday effect by applying external magnetic fields to said Faraday element in two or more of directions and varying a synthetic magnetic field synthesized from the magnetic fields, wherein:

the light beam is rendered incident on the (111) plane of said garnet single crystal; and a displacement path of a synthetic vector of the external magnetic fields is within a fan-shaped range of a stereographic projection chart of said garnet single crystal with the (111) plane taken as the center of said chart, said fan-shaped range being spread 20° rightward and leftward from a straight line connecting a point indicating the (111) plane positioned at the center of said stereographic projection chart to a point indicating one of crystal planes equivalent to the (100) plane.

9. A Faraday rotation angle varying apparatus according to claim 8, wherein the displacement path of the synthetic vector of the external magnetic fields is within a fan-shaped range of said stereographic projection chart of said garnet single crystal with the (111) plane taken as the center of said chart, said fan-shaped range being spread 10° rightward and leftward from a straight line connecting a point indicating the (111) plane positioned at the center of said stereographic projection chart to a point indicating one of crystal planes equivalent to the (100) plane.

10. A Faraday rotation angle varying apparatus according to claim 8, wherein the displacement path of the synthetic vector of the external magnetic fields is within a fan-shaped range of said stereographic projection chart of said garnet single crystal with the (111) plane taken as the center of said chart, said fan-shaped range being spread 2° rightward and leftward from a straight line connecting a point indicating the (111) plane positioned at the center of said stereographic projection chart to a point indicating one of crystal planes equivalent to the (100) plane.

11. A Faraday rotation angle varying apparatus according to claim 8, wherein said garnet single crystal is applied with external magnetic fields in two directions parallel and perpendicular to the light beam direction by permanent magnets and an electromagnet, respectively.

12. A Faraday rotation angle varying apparatus according to claim 8, wherein said garnet single crystal is prepared by a liquid phase epitaxial method and has a chemical composition expressed by $(RBi)_3(FeM)_5O_{12}$ or $(RBi)_3Fe_5O_{12}$ where R indicates one or more kinds of elements selected from rare earth elements including yttrium and M is one or more kinds of elements capable of being substituted for Fe.

13. A Faraday rotation angle varying apparatus according to claim 8, wherein said garnet single crystal has a chemical composition expressed by $Y_3Fe_5O_{12}$.

14. A Faraday rotation angle varying apparatus for controlling a Faraday rotation angle of a light beam passing through a garnet single crystal having a Faraday effect by applying external magnetic fields to said garnet single crystal in two or more of directions and varying a synthetic magnetic field synthesized from the magnetic fields, wherein:

the light beam is rendered incident on the (111) plane of said garnet single crystal; and a displacement path of a synthetic vector of the. external magnetic fields is within a fan-shaped range of a stereographic projection chart of said garnet single crystal with the (111) plane taken as the center of said chart, said fan-shaped range being spread a predetermined spread angle rightward and leftward from a straight line connecting a point indicating the (111) plane positioned at the center of said stereographic projection chart to a point indicating one of crystal planes equivalent to a predetermined crystal plane.

* * * * *